United States Patent
Gass et al.

(10) Patent No.: US 11,265,180 B2
(45) Date of Patent: Mar. 1, 2022

(54) CONCURRENT CLUSTER NODES SELF START

(71) Applicant: International Business Machines Corporation, Armonk, NY (US)

(72) Inventors: Jason Gass, Rochester, MN (US); Kiswanto Thayib, Rochester, MN (US); Robert Miller, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 79 days.

(21) Appl. No.: 16/439,830

(22) Filed: Jun. 13, 2019

(65) Prior Publication Data

US 2020/0396093 A1    Dec. 17, 2020

(51) Int. Cl.
| | | |
|---|---|---|
| *G06F 15/16* | (2006.01) | |
| *H04L 12/12* | (2006.01) | |
| *H04L 43/10* | (2022.01) | |
| *H04L 67/10* | (2022.01) | |

(52) U.S. Cl.
CPC .............. *H04L 12/12* (2013.01); *H04L 43/10* (2013.01); *H04L 67/10* (2013.01)

(58) Field of Classification Search
CPC ...................................................... H04L 12/12
See application file for complete search history.

(56) References Cited

U.S. PATENT DOCUMENTS

| 7,240,088 | B2 | 7/2007 | Block et al. | |
|---|---|---|---|---|
| 10,379,985 | B1 * | 8/2019 | White | G06F 11/0757 |
| 2003/0145050 | A1 * | 7/2003 | Block | H04L 67/1002 709/204 |
| 2009/0049172 | A1 * | 2/2009 | Miller | H04L 67/104 709/225 |
| 2015/0117375 | A1 * | 4/2015 | Sartori | H04W 56/002 370/329 |

OTHER PUBLICATIONS

Authors et al.: Disclosed Anonymously, "Floating Application Services Protocols and Framework Principles / Cluster Floating Application Controller for GPFS," IP.com No. IPCOM000230683D, IP.com Electronic Publication Date: Sep. 3, 2013, 8 pages.
Authors et al.: Disclosed Anonymously, "Method to speed up failover of applications in cluster," IP.com No. IPCOM000248150D, IP.com Electronic Publication Date: Nov. 2, 2016, 11 pages.
Authors et al.: Disclosed Anonymously, "Cluster Resource Quorum without a Majority of Nodes," IP.com No. IPCOM000251247D, IP.com Electronic Publication Date: Oct. 26, 2017, 8 pages.
An Oracle White Paper, "Achieving High Availability with Oracle Tuxedo," Jul. 2012, 19 pages.

* cited by examiner

*Primary Examiner* — Kevin T Bates
*Assistant Examiner* — Clarence D McCray
(74) *Attorney, Agent, or Firm* — Patterson + Sheridan, LLP

(57) ABSTRACT

Techniques for concurrent node startup are provided. A first startup instruction is received by a first node of a plurality of nodes, and the first node enters an initial startup state. The first node further transmits a first ping to the plurality of nodes, and determines, based on the first ping, that none of the plurality of nodes are in an active state or in a secondary startup state. Upon determining that no additional pings have been received, the first node enters the secondary startup state. Finally, the first node enters the active state, where the first node enters the active state as an initial node in a new cluster.

20 Claims, 6 Drawing Sheets

CONCURRENT CLUSTER NODES SELF START

BACKGROUND

The present disclosure relates to cluster computing, and more specifically, to concurrent startup of cluster nodes.

Computing nodes can operate in clusters, which allows the nodes to share computing tasks, resources, and the like. Typically, when a node is activated or starts up, it searches for an existing active cluster. If one is found, the starting node joins this cluster, and operates as a part of the already-created cluster. In contrast, if no operating clusters are found, the starting node will create its own cluster that other nodes can subsequently join. However, in existing systems, if two or more nodes start concurrently or simultaneously, each node will fail to find any existing clusters. Thus, in existing systems, each node will create its own single-node cluster, which reduces efficiency and increases computing overhead. Further, during operation, the single-node clusters are typically distinct and do not interact with each other until the clusters merge. Thus, even if the clusters can be subsequently merged, difficulties remain with respect to conflicts in resource configurations and utilization, due to the time spent operating separately.

SUMMARY

According to one embodiment of the present disclosure, a method is provided. The method includes receiving, by a first node of a plurality of nodes, a first startup instruction. The method further includes entering, by the first node, an initial startup state, and transmitting, by the first node, a first ping to the plurality of nodes. Additionally, the method includes determining, based on the first ping, that none of the plurality of nodes are in an active state or in a secondary startup state. Upon determining that no additional pings have been received, the method also includes entering, by the first node, the secondary startup state. Finally, the method includes entering, by the first node, the active state, wherein the first node enters the active state as an initial node in a new cluster.

According to a second embodiment of the present disclosure, a computer-readable storage medium is provided. The computer-readable storage medium has computer-readable program code embodied therewith, which is executable by one or more computer processors to perform an operation. The operation includes receiving, by a first node of a plurality of nodes, a first startup instruction. The operation further includes entering, by the first node, an initial startup state, and transmitting, by the first node, a first ping to the plurality of nodes. Additionally, the operation includes determining, based on the first ping, that none of the plurality of nodes are in an active state or in a secondary startup state. Upon determining that no additional pings have been received, the operation also includes entering, by the first node, the secondary startup state. Finally, the operation includes entering, by the first node, the active state, wherein the first node enters the active state as an initial node in a new cluster.

According to a third embodiment of the present disclosure, a system is provided. The system includes one or more computer processors, and a memory containing a program. The program, when executed by the one or more computer processors, performs an operation. The operation includes receiving, by a first node of a plurality of nodes, a first startup instruction. The operation further includes entering, by the first node, an initial startup state, and transmitting, by the first node, a first ping to the plurality of nodes. Additionally, the operation includes determining, based on the first ping, that none of the plurality of nodes are in an active state or in a secondary startup state. Upon determining that no additional pings have been received, the operation also includes entering, by the first node, the secondary startup state. Finally, the operation includes entering, by the first node, the active state, wherein the first node enters the active state as an initial node in a new cluster.

DETAILED DESCRIPTION

Embodiments of the present disclosure enable concurrent node startup without risk of conflicting clusters being created. In an embodiment, upon receiving a startup instruction or request, each node proceeds through multiple distinct phases of startup, with a look-behind procedure being completed between the phases (or as part of one of the phases). In one embodiment, during an initial startup phase, the node determines the state of other node(s), and proceeds based on these discovered states. In embodiments, depending on the received responses, the starting node may proceed directly to a secondary startup phase, restart the initial startup phase, perform a look-behind procedure, or initiate other processes. In some embodiments, during the secondary startup phase, the node has committed to entering the active phase, and the particular methodology used to finalize activation depends on the responses received during the initial startup phase.

In one embodiment of the present disclosure, if a starting node discovers, during the initial startup phase, that an active cluster exists, the node can proceed directly to the secondary phase and complete startup by joining this cluster. In some embodiments, if no active cluster exists, the starting node determines whether there are any nodes currently in the secondary phase. If so, the node can iteratively repeat the initial discovery phase until an active cluster exists. In an embodiment, if no nodes are in the first, secondary, or active state, the initial node can proceed towards the secondary phase, with a look-behind procedure in between. In one embodiment, the look-behind procedure involves determining whether any additional pings or responses have been received during the initial phase processing. If so, the node returns to the beginning of the phase, in order to determine how to proceed. Additionally, in some embodiments, if one or more other nodes are identified in the initial startup phase, the nodes determine the relative priority of each such node, in order to determine how to proceed.

Figure 1:
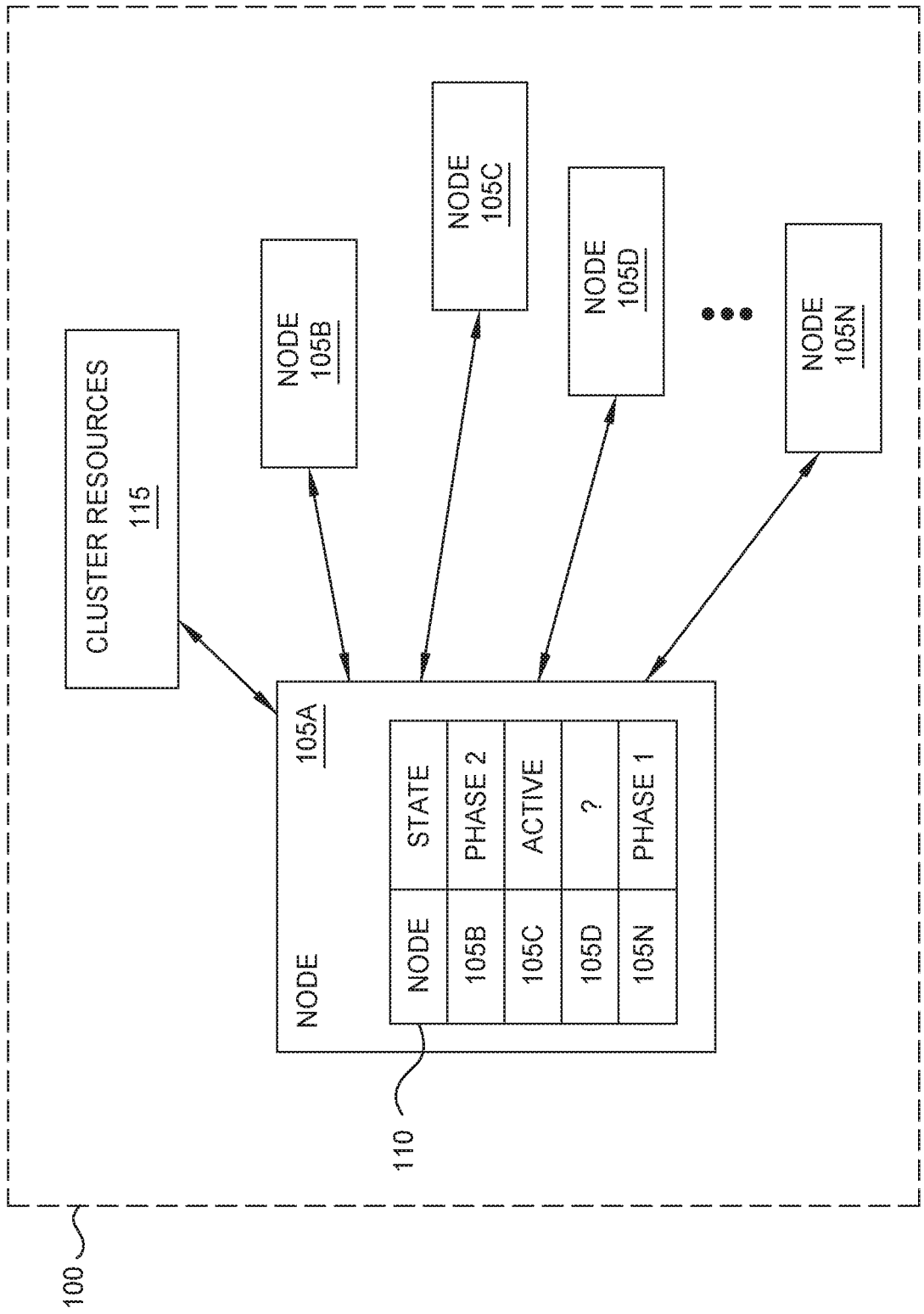
FIG. 1 illustrates a cluster of self-starting nodes configured to handle concurrent startup, according to one embodiment disclosed herein.

FIG. 1 illustrates a Cluster 100 of self-starting Nodes 105 configured to handle concurrent startup, according to one embodiment disclosed herein. In the illustrated embodiment, the computing Cluster 100 includes several Nodes 105A-N, as well as a set of Cluster Resources 115. There may generally be any number of Nodes 105 in a given Cluster 100. In embodiments, the Cluster Resources 115 generally include any computer resource, and are available as a shared resource for any Node 105 in the Cluster 100. In various embodiments, the Cluster Resources 115 can include, for example, storage, compute power, IP addresses and/or access to a broader network (such as the Internet), and the like. In embodiments, Nodes 105 within a Cluster 100 can share the Cluster Resources 115, but any Nodes 105 outside of the Cluster 100 (e.g., in a different cluster) cannot access the Cluster Resources 115 of the first Cluster 100. In some embodiments, each Cluster 100 has its own set of Cluster Resources 115. In one embodiment, the nodes are still considered to be part of a single cluster (and thus must share access to the Cluster Resources 115) if two Nodes 105 form separate single-node clusters (e.g., partitions within the same cluster).

In one embodiment, if multiple separate clusters are created, the shared Cluster Resources 115 are partitioned such that each cluster has its own portion of the Cluster Resources 115. In embodiments, the Cluster Resources 115 (and the Nodes 105 within each Cluster 100) are kept partitioned from each other, such that the clusters do not share resources or otherwise interact. In embodiments, during startup, each Node 105 maintains an array or table of Node States 110. Although the illustrated depiction only includes these Node States 110 in Node 105A for clarity, in embodiments, each Node 105A-N maintains a similar array during startup. Further, in the illustrated embodiment, the Node 105A can communicate with the remaining Nodes 105B-N, as well as the Cluster Resources 115, as illustrated by arrows. In embodiments, each Node 105A-N can similarly communicate with each other Node 105A-N, as well as the Cluster Resources 115. These communication arrows are omitted from FIG. 1 for clarity.

In an embodiment, when a Node 105 receives a startup command (e.g., an instruction to power on, reboot, or otherwise change from an inactive state to an active state), the Node 105 transmits a communication to each other Node 105, in order to determine the current state of each Node 105. In one embodiment, each Node 105A-N maintains a record of each other Node 105A-N that it has a predefined relationship with, in that it can become part of the same Cluster 100. That is, an administrator or user can define a set of Nodes 105A-N that are allowed or configured to operate together in a Cluster 100 when activated. In such an embodiment, each Node 105A-N stores a record of the other Node(s) 105A-N it is associated with (e.g., configured to operate in a cluster with). In one embodiment, determining the state of these neighboring or associated Nodes 105A-N includes sending a cluster ping to each such Node 105A-N, and awaiting a response.

In one embodiment, this cluster ping is a relatively lightweight communication that occurs outside of the traditional IP stack. Thus, each Node 105A-N can send (and respond to) pings without being connected to a broader network such as the Internet, and, in some embodiments, without being fully activated or operational (e.g., during an initial startup phase). In one embodiment, the Nodes 105A-N use a predefined timeout period for this cluster ping. Each Node 105A-N that has not responded within this window is considered "unresponsive," "inactive," or in an "unknown" state. Based on these states, the Node 105A can determine how to proceed with its startup. In the illustrated embodiment, the Node 105A has determined based on its ping that the Node 105B is in phase 2 of the startup procedure, Node 105C is in an active state, Node 105D is unresponsive (e.g., has not yet started up, or is otherwise experiencing communication or operations issues), and Node 105N is in phase 1 of the startup.

In one embodiment, the startup process includes two phases, referred to herein as an "initial" phase (also referred to as a "first phase" or "phase one") and a "secondary" phase (also referred to as a "final phase" or "phase two"). In some embodiments, a "look behind" phase is also included in the startup procedures. In another embodiment, the look behind is included as a portion of the first or second phase. In embodiments, a given Node 105A-N may also be in an inactive or unresponsive state, or in an active state. As used herein, a Node 105A-N is in an "active" state when it is operational and performing ordinary functions that the Node 105A-N is intended to perform, such as processing workloads and requests for applications and/or users. In embodiments, the Nodes 105A-N can generally include any computing node configured to perform any computing task desired. In some embodiments, because the Node 105A has determined that the Node 105C is in an active state, the Node 105A will complete its startup by joining the Cluster 100 to which the Node 105A belongs. That is, because an active cluster already exists, the Node 105A will join this cluster to avoid splitting the Cluster Resources 115 and potentially causing inefficiencies or incompatibilities.

In some embodiments of the present disclosure, this cluster ping and state discovery are performed by each Node 105A-N when in the initial startup phase. Based on the results of this initial startup phase, the Node 105A-N can either restart the initial phase (as discussed in more detail below) by transmitting a new ping, or can proceed into the secondary startup phase. When the secondary startup phase is complete, the Node 105A-N enters active operations as part of a cluster.

Figure 2:
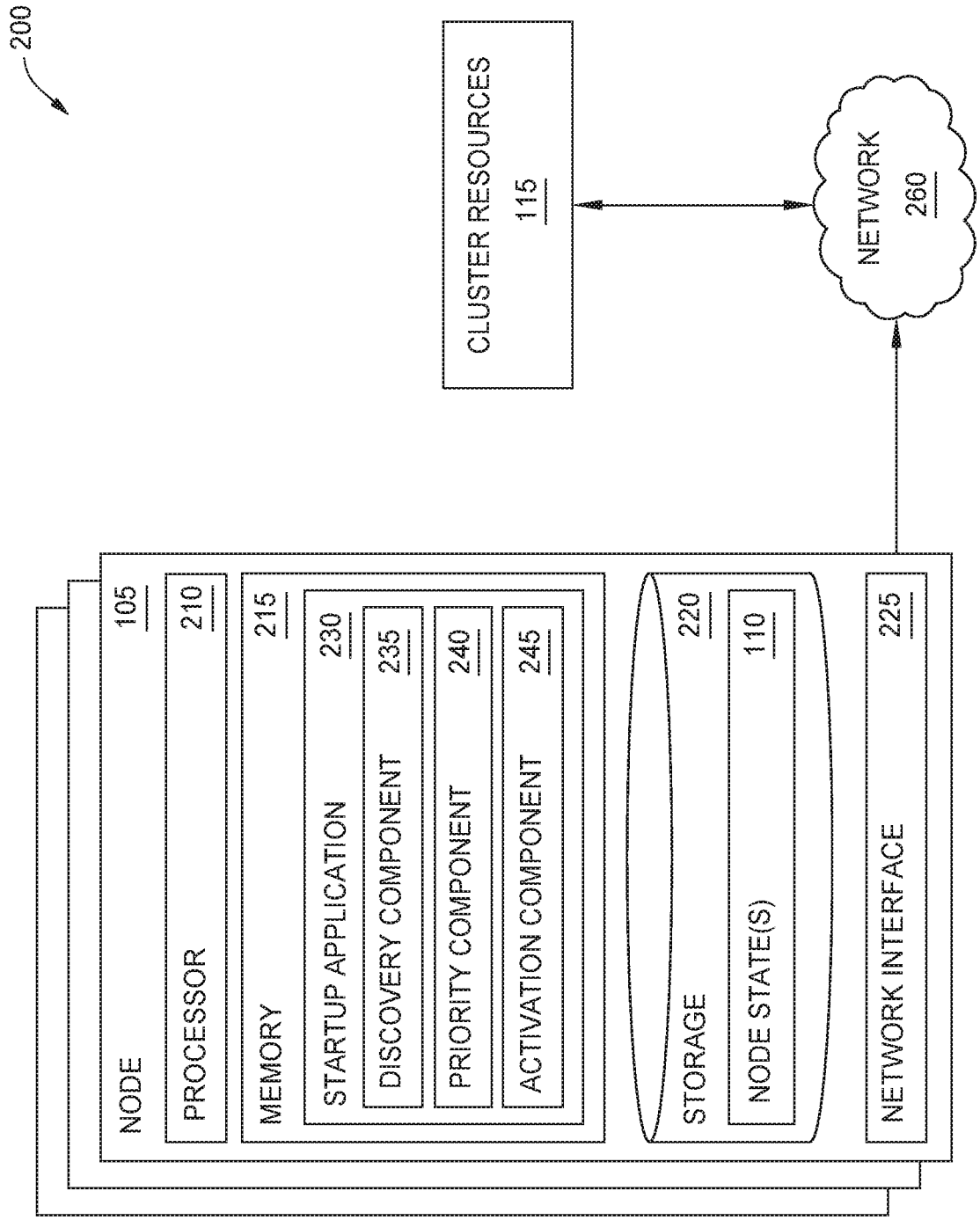
FIG. 2 is a block diagram illustrating a node configured to perform concurrent startup, according to one embodiment disclosed herein.

FIG. 2 is a block diagram illustrating a Node 105 configured to perform concurrent startup, according to one embodiment disclosed herein. In the illustrated embodiment, the Node 105 includes a Processor 210, a Memory 215, Storage 220, and a Network Interface 225. In the illustrated embodiment, Processor 210 retrieves and executes programming instructions stored in Memory 215 as well as stores and retrieves application data residing in Storage 220. Processor 210 is representative of a single CPU, multiple CPUs, a single CPU having multiple processing cores, and the like. Memory 215 is generally included to be representative of a random access memory. Storage 220 may be a disk drive or flash-based storage device, and may include fixed and/or removable storage devices, such as fixed disk drives, removable memory cards, or optical storage, network attached storage (NAS), or storage area network (SAN). Via the Network Interface 225, the Node 105 can be communicatively coupled with one or more other devices and components, including other Nodes 105, Cluster Resources 115, and the like.

Although illustrated as physical devices, in embodiments, each Node 105 may correspond to a virtual computing node. In the illustrated embodiment, the Storage 220 includes a record of the Node State(s) 110 for each of the other nodes with which the Node 105 has a predefined association or relationship. As discussed above, in an embodiment, this predefined association indicates that the nodes can operate together in a cluster and share cluster resources. Although illustrated as residing in Storage 220, in embodiments, the Node States 110 may reside in other locations, such as in Memory 215. In the illustrated embodiment, the Memory 215 includes a Startup Application 230. Although depicted as software residing in Memory 215, in embodiments, the operations of the Startup Application 230 can be implemented using hardware, software, or a combination of hardware and software.

In an embodiment, the Startup Application 230 handles initialization of the Node 105. Although not depicted in the illustrated embodiment, there may of course be other applications and components to perform the ordinary operations of the Node 105 while in use. As illustrated, the Startup Application 230 includes a Discovery Component 235, a Priority Component 240, and an Activation Component 245. Although depicted as discrete components for clarity, in embodiments, the operations of the Discovery Component 235, Priority Component 240, and Activation Component 245 may be combined or distributed across any number of components. In embodiments, when the Node 105 receives a startup command, instruction, or request, the Startup Application 230 triggers. In various embodiments, the startup instruction can include an indication or request received from a user or from another device. In some embodiments, the Node 105 is configured to begin startup automatically as soon as it is powered on. Regardless of the particulars of the startup command, in embodiments, the Startup Application 230 proceeds through the several phases of startup to enter active operations.

In one embodiment, the Discovery Component 235 generates and transmits one or more pings to the other nodes with which the Node 105 has a predefined relationship, in order to determine the current state of each related node. As responses are received, the Discovery Component 235 updates the Node States 110 to reflect the current status of each node. In some embodiments, in addition to transmitting these pings and receiving responses, the Discovery Component 235 also receives pings from other node, and generates and returns responses. For example, when another node 105 begins startup and sends out a cluster ping, the Discovery Component 235 (if the Node 105 is currently in startup or in an active state) can determine the current status of the Node 105 and transmit an indication of its status to the requesting node.

In some embodiments, the Discovery Component 235 uses a predefined timeout window during which the Startup Application 230 awaits responses. After this window has passed, in an embodiment, the Startup Application 230 proceeds with the startup processes, under the assumption that any nodes which have not yet responded are offline or otherwise unavailable. In one embodiment, if an additional response is subsequently received during the startup procedure, the Discovery Component 235 causes the Startup Application 230 to restart the process, as discussed below in more detail. In some embodiments, the startup process includes a "look behind" operation to ensure the Node States 110 are up to date. The Discovery Component 235 can perform this lookback at the end of the initial startup phase, between the initial and the secondary startup phases, at the beginning of the secondary startup phase, or at another time in the startup process.

In one embodiment, performing the look behind procedure includes determining whether the Node 105 received any communications from another node during the startup operations (after the predefined discovery window). For example, in one embodiment, once the window has passed, the Startup Application 230 completes the initial startup procedures based on the responses received. After this initial startup is completed, in one embodiment, the Discovery Component 235 performs the look behind operation by determining whether any delayed ping responses were received, and/or whether any new pings were received from another node. In some embodiments, rather than occurring at a defined time during the startup, this look behind is performed concurrently throughout the startup, such that the Discovery Component 235 can interrupt the normal startup procedure if a new response or ping is received. In one embodiment, if the look behind determines that a new communication has been received, the Startup Application 230 restarts the startup process, as discussed in more detail below.

In some embodiments, the particular startup procedure can vary based on the relative priority of the nodes. In such an embodiment, the Priority Component 240 can determine the priority of each node, as needed. For example, in one embodiment, if two or more nodes are both in the initial startup phase, the Priority Component 240 determines whether the Node 105 has priority over the other nodes in this phase. If so, the Startup Application 230 continues. If another node in the initial phase has higher priority, however, the Startup Application 230 delays or restarts the startup procedures. In some embodiments, the nodes are associated with predefined priorities, specified by a user or administrator. In one embodiment, the priority is based on a name, number or other label associated with the node. For example, in one embodiment, node "001" may have priority over node "002." Similarly, node "ABC" may have priority over node "XYZ" (e.g., because "ABC" is first alphabetically). In embodiments, any method of determining priority can be utilized.

In the illustrated embodiment, the Activation Component 245 is responsible for completing the secondary or final startup phase, and placing the Node 105 into active status. In one embodiment, after the initial startup phase and look-behind operation are successfully completed, the Activation Component 245 determines whether to initialize the Node 105 as the first node of a new cluster, or to join an existing cluster. In embodiments, this determination is made based on the Node States 110, as updated by the Discovery Component 235. In an embodiment, if there is an existing active cluster, the Activation Component 245 joins this cluster. In contrast, if there are no other active nodes, the Activation Component 245 starts a new cluster when the Node 105 finalizes its startup.

Figure 3:
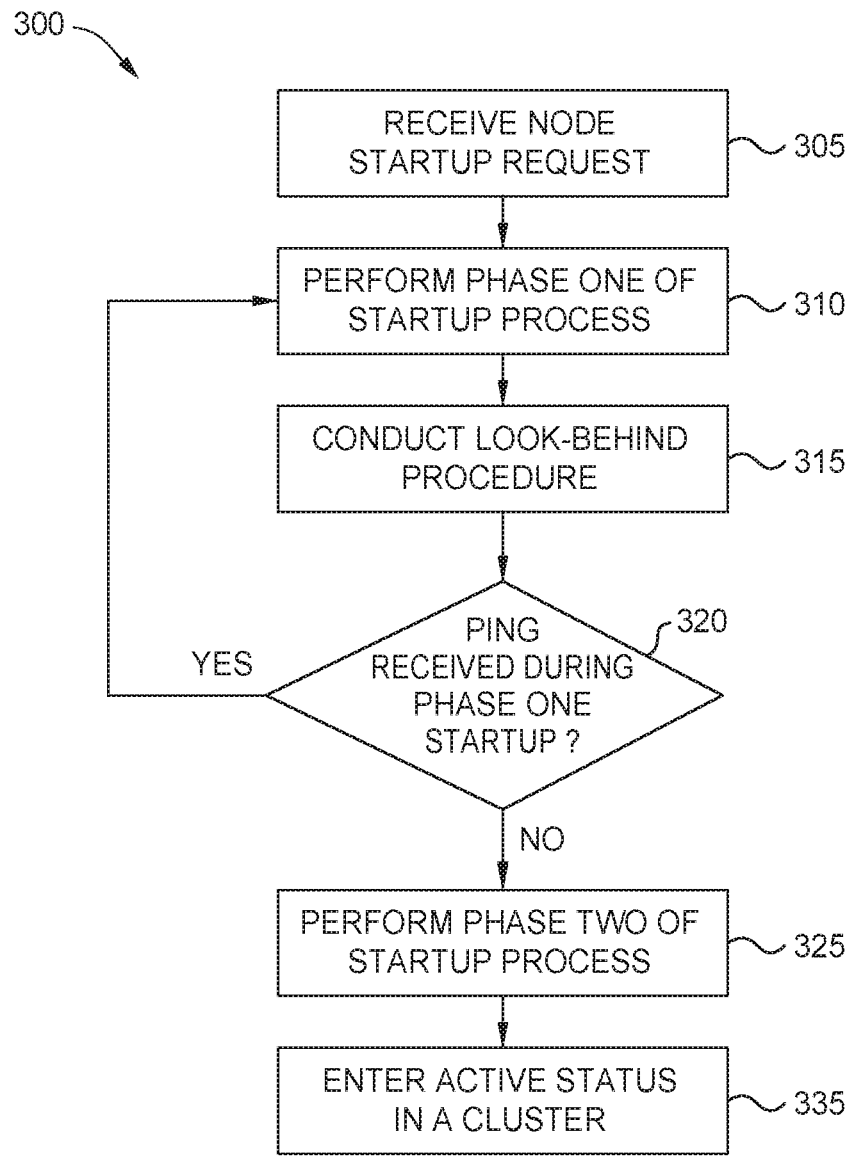
FIG. 3 is a flow diagram illustrating a method for concurrent startup of cluster nodes, according to one embodiment disclosed herein.

FIG. 3 is a flow diagram illustrating a method 300 for concurrent startup of cluster nodes, according to one embodiment disclosed herein. As illustrated, the method 300 begins when a Startup Application 230 of a Node 105 receives a startup request. As discussed above, in embodiments, this can include a manual request from a user or administrator, a programmatic request from another device or application, an automatic initialization when the Node 105 is powered on, and the like. The method 300 then proceeds to block 310, where the Startup Application 230 performs the initial startup phase. In some embodiments, this includes discovering the current state of the other node(s) with which the Node 105 has a predefined relationship or association. Depending on the discovered states, the Startup Application 230 may repeat the initial phase, proceed to the secondary or final phase, or take other actions.

If the initial startup phase is completed successfully, the method 300 proceeds to block 315, where the Startup Application 230 conducts the look-behind procedure discussed above. In one embodiment, the look-behind involves checking for any new responses or pings that the Node 105 received during the initial phase. At block 320, the Startup Application 230 thereafter determines whether the look-behind procedure resulted in identifying one or more pings that were received during phase one. If so, the method 300 returns to block 310 to restart the initial startup phase. Otherwise, the method 300 continues to block 325, where the Startup Application 230 performs the secondary startup phase. As discussed above, this can include starting a new cluster or joining an existing cluster. Finally, once this phase two is completed, the method 300 terminates at block 335, where the Node 105 enters active status in a cluster.

Figure 4A:
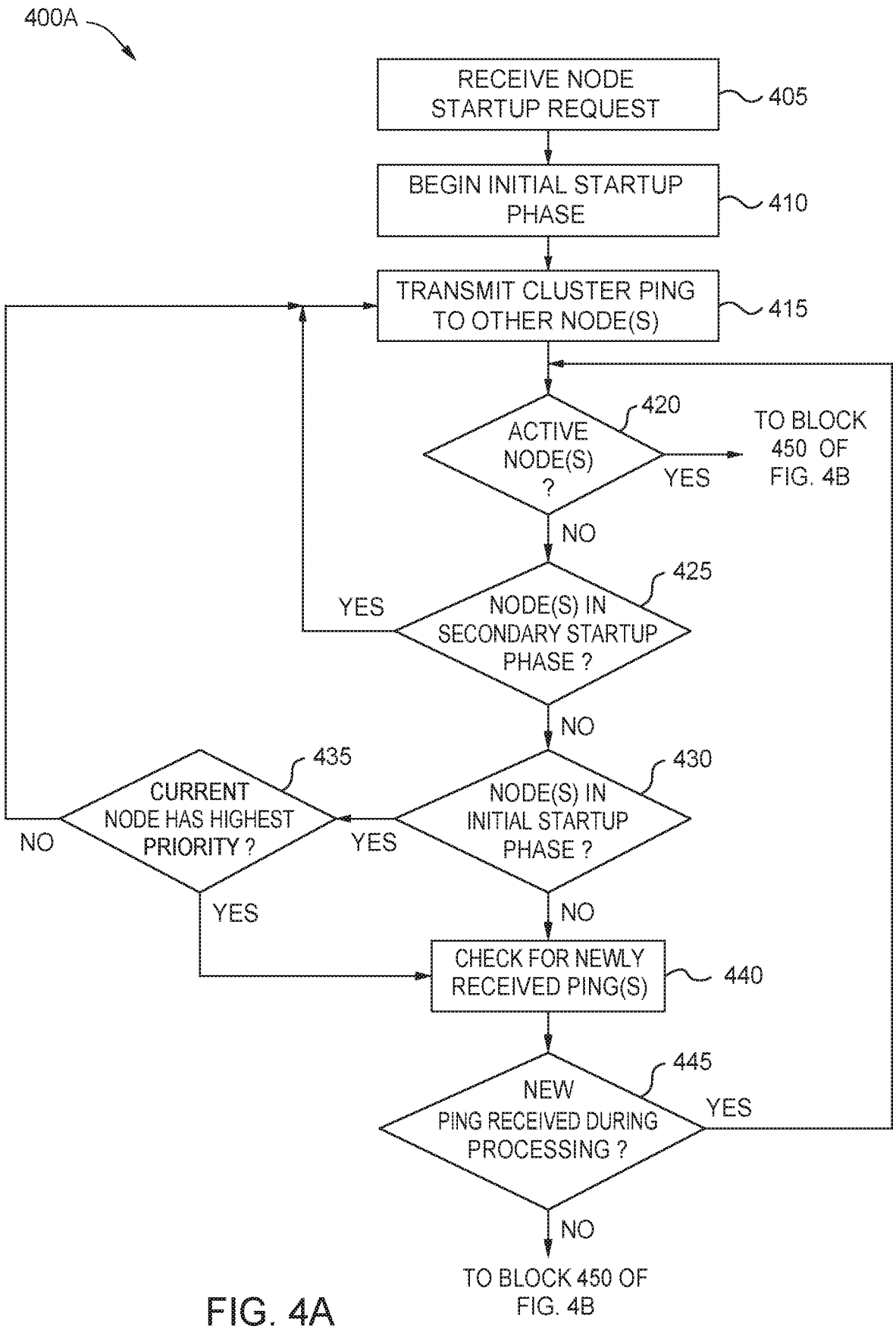
FIGS. 4A and 4B are flow diagrams illustrating a method for a cluster node to startup in a concurrent startup environment, according to one embodiment disclosed herein.
Figure 4B:
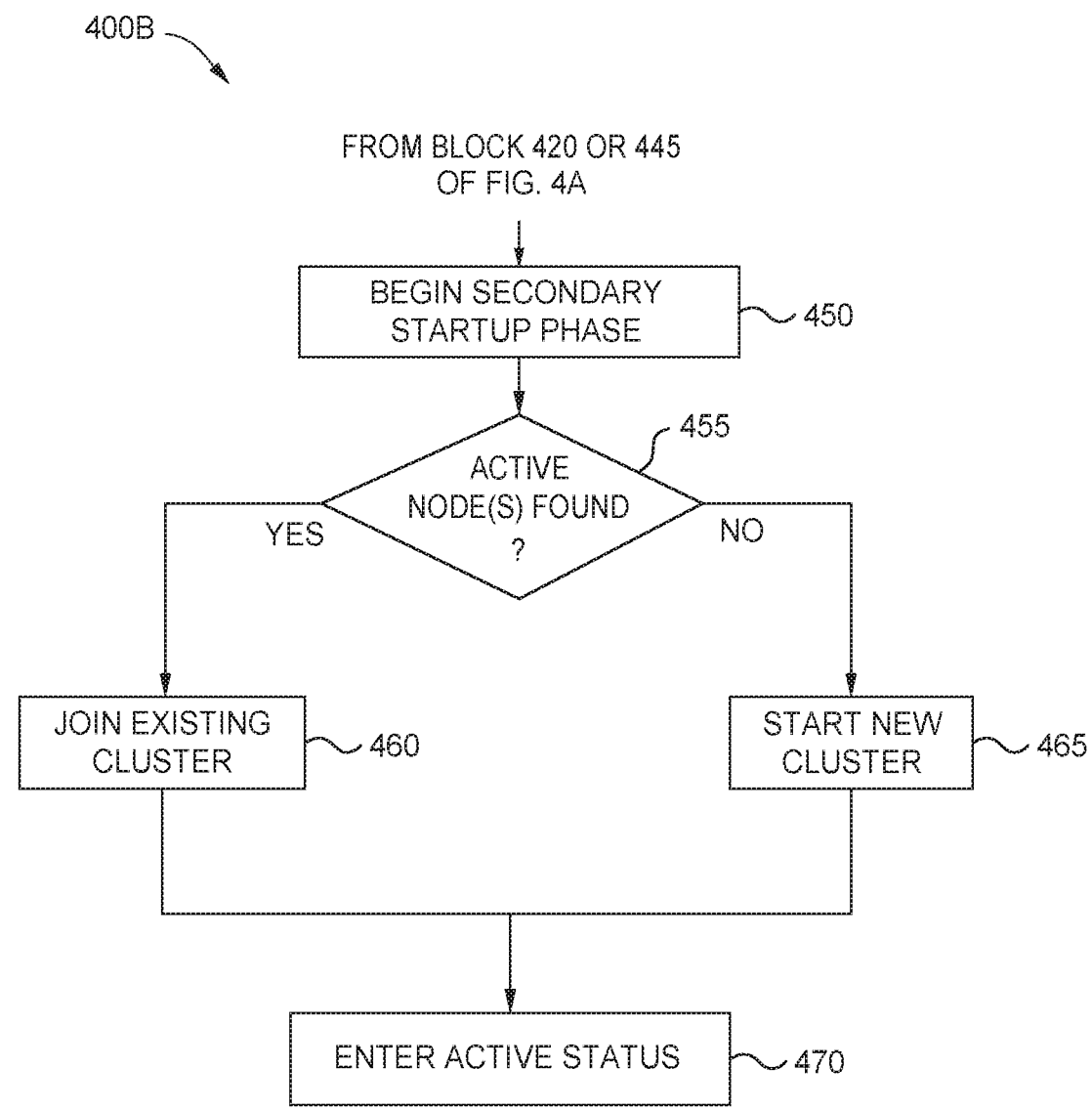

FIGS. 4A and 4B are flow diagrams illustrating a method 400 for a cluster node to startup in a concurrent startup environment, according to one embodiment disclosed herein. In an embodiment, FIGS. 4A and 4B provide additional detail for the startup procedures discussed above with reference to FIG. 3. In the illustrated embodiment, FIG. 4A depicts the method 400A, which corresponds to the initial startup phase and the look-behind phase, while FIG. 4B depicts a method 400B, corresponding to the secondary or final startup phase. With reference to FIG. 4A, the method 400A begins at block 405, where a Startup Application 230 of a Node 105 receives a startup request or instruction, as discussed above.

At block 410, the Startup Application 230 enters phase one (the initial startup phase). The method 400A then continues to block 415, where the Startup Application 230 transmits a cluster ping to one or more other nodes with which the Node 105 has a predefined association or relationship. In an embodiment, the Startup Application 230 then awaits a predefined period of time for responses from the node(s), and updates the Node States 110 with each response. The method 400A proceeds to block 420, where the Startup Application 230 determines (based on the array of Node States 110) whether any of the other node(s) are in an active state. If so, the method 400A continues to block 450 in FIG. 4B, where the Startup Application 230 begins the secondary startup phase. This is discussed in more detail below.

Returning to block 420, if the Startup Application 230 determines that there are no active nodes in the group, the method 400A proceeds to block 425, where the Startup Application 230 determines whether there is at least one related node that is in the secondary startup phase. In an embodiment, when a node enters the secondary startup phase, the node is committed to finalizing startup and entering an active state (either as a new cluster or as part of an existing cluster). Thus, in embodiments, the Node 105 should not proceed with startup, but should instead wait for the other node(s) to complete their startup (e.g., because they are likely to complete it sooner, given that they are further along the startup procedure). Notably, the nodes do not utilize any predefined priority at this stage of the startup. The Node 105 can then join this new cluster when it starts up. As illustrated, if there is at least one neighboring or relevant node in the secondary phase, the method 400A returns to block 415 to transmit a new cluster ping.

In the illustrated embodiment, the Startup Application 230 iteratively repeats this loop including blocks 415, 420, and 425 until one of the nodes in the secondary phase either exits startup and enters active state (at which point the method 400A proceeds to block 450), or fails to complete the second phase and reboots, crashes, or otherwise restarts the startup process. In practice, the Startup Application 230 typically only repeats this loop a small number of times, as the other nodes can complete startup relatively quickly. If, at block 425, the Startup Application 230 determines that none of the related nodes are in the secondary startup phase, the method 400A proceeds to block 430.

At block 430, the Startup Application 230 determines, based on the Node States 110, whether any of the other nodes are in the initial startup phase (e.g., the same phase as the Node 105). If there are no other nodes in the initial startup phase, the method 400A continues to block 440 to perform the look-behind, as discussed in more detail below. Returning to block 430, if at least one other node is also in the initial startup phase, the method 400A continues to block 435, where the Startup Application 230 determines the relative priority of each node in the initial startup phase, and determines whether the Node 105 on which the Startup Application 230 is executing has the highest priority. As discussed above, in some embodiments, the Startup Application 230 uses a name, number, identifier, or other label associated with each node to determine priority of the nodes. In an embodiment, this label can correspond to any sortable data value. In various embodiments, the identifier can include a string, a numeric value, and the like.

If the Startup Application 230 determines that at least one other node in the initial startup phase has a higher priority than the index Node 105 on which the Startup Application 230 is executing, the method 400A returns to block 415 to send out another cluster ping. That is, because the at least one other node is also in the initial startup phase but has higher priority than the Startup Application 230, the Startup Application 230 will iterate through until that node enters the secondary startup phase, completes the secondary startup phase, and enters active operations (or fails to complete startup). In this way, the Startup Application 230 defers to other node(s) with higher priority when performing the startup procedure, if the nodes are at the same stage of the startup process. Note however that in some embodiments, a node with a lower defined priority can still complete the startup process and become the first node of a cluster, if it reaches the secondary phase before the higher priority nodes.

Returning to block 435, if the Startup Application 230 determines that its corresponding Node 105 has the highest priority of all nodes currently in the initial startup phase, the method 400A proceeds to block 440, where the Startup Application 230 exits the initial startup phase and conducts the look-behind procedure. Specifically, in the illustrated embodiment, the Startup Application 230 checks for any newly received pings or responses that have been received since the timeout window closed during block 415. As discussed above, in an embodiment, the Startup Application 230 will not continue to the secondary startup phase if this look-behind fails. That is, if another response or ping has been received, the Startup Application 230 will not complete startup because the newly received response or ping may indicate that another cluster already exists (or will exist shortly), and the Node 105 should not start a new cluster. For example, an active node or a node in the secondary startup phase may have encountered delays in responding to the initial ping. Similarly, a node with higher priority may have just begun startup (and sent its own cluster ping).

Continuing to block 445, if a new communication was identified during the look-behind, the Startup Application 230 updates the Node States 110 based on the new information, and the method 400A returns to block 420. In some embodiments, the method 400A instead returns to block 415, and the Startup Application 230 transmits another cluster ping to update all of the Node States 110. If at block 445, however, the Startup Application 230 determines that no new signals were detected, the Startup Application 230 exits the look-behind stage, and the method 400A continues to block 450.

At block 450, the Startup Application 230 enters the secondary (or final) startup phase. The method 400B then continues to block 455, where the Startup Application 230 determines whether at least one active node was identified, based on the Node States 110. If so, the method 400B continues to block 460, where the Startup Application 230 joins the existing cluster to which the identified active node(s) belong. The method 400B then proceeds to block 470. Alternatively, if the Startup Application 230 determines that there are no active node(s), the method 400B continues to block 465, where the Startup Application 230 becomes the first node in a new cluster. Finally, at block 470, the Node 105 enters the active state as part of the cluster (either newly created, or an existing cluster with one or more other nodes).

In this way, embodiments of the present disclosure enable compute nodes to being concurrently self-started without risking multiple clusters being created. Embodiments of the present disclosure utilize a multi-phase startup procedure with at least two distinct checks for the state of other nodes (e.g., at least one cluster ping at block 415, as well as the look-behind at block 440). This ensures that when a node enters the secondary phase (and thereafter enters full active state), it will not mistakenly create a new cluster when another cluster already exists. Embodiments of the present disclosure thereby improve computing efficiency and cluster compute operations by reducing the overhead and resource contention introduced by multiple clusters, while maintaining a streamlined startup process that allows any node to become the primary or initial node, and does not require a strictly enforced hierarchy that can cause nodes to spin for long periods of time while waiting for a master node to initialize.

Figure 5:
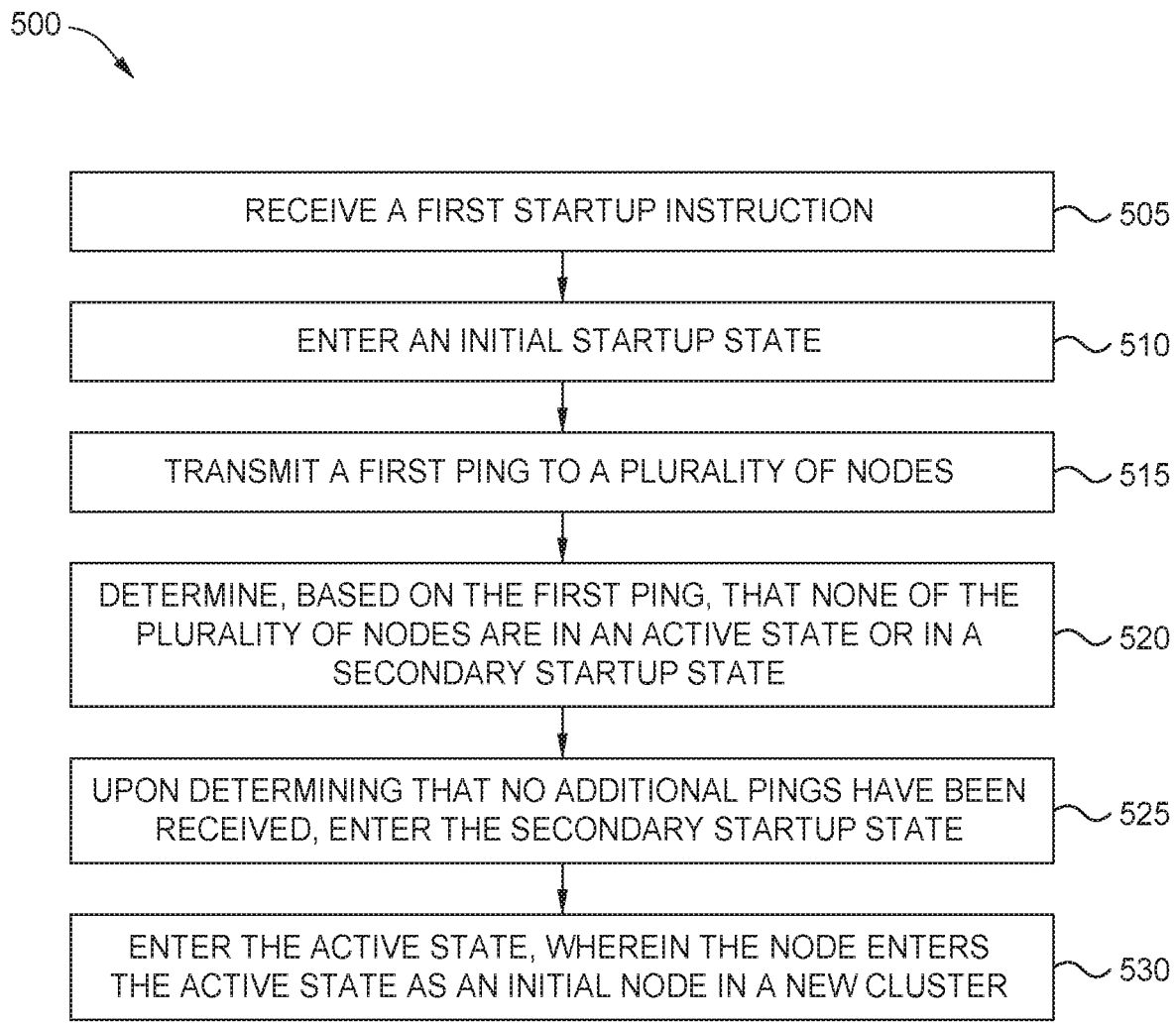
FIG. 5 is a flow diagram illustrating a method for node startup, according to one embodiment disclosed herein.

FIG. 5 is a flow diagram illustrating a method 500 for node startup, according to one embodiment disclosed herein. The method 500 begins at block 505, where a Startup Application 230 of a first Node 105 receives a first startup instruction. The method 500 then continues to block 510, where the Startup Application 230 enters an initial startup state. At block 515, the Startup Application 230 transmits a first ping to a plurality of nodes. Further, at block 520, the Startup Application 230 determines, based on the first ping, that none of the plurality of nodes are in an active state or in a secondary startup state. The method 500 then continues to block 525 where, the look-behind procedure is completed. Specifically, upon determining that no additional pings have been received, the Startup Application 230 enters the secondary startup state. Finally, at block 530, the Node 105 enters the active state, wherein the Node 105 enters the active state as an initial node in a new cluster.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the Startup Application 230) or related data available in the cloud. For example, the computing node clusters could execute on a computing system in the cloud and perform safe and concurrent startups. In such a case, each node could operate in the cloud, and store updated node states at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:
   receiving, by a first node of a plurality of nodes, a first startup instruction commanding the first node to enter an active state;
   responsive to receiving the first startup instruction, beginning startup by entering, by the first node, an initial startup state;
   transmitting, by the first node in the initial startup state, a first ping to the plurality of nodes;
   receiving, by the first node in the initial startup state, one or more responses to the first ping, wherein the one or more responses indicate a current state of one or more nodes of the plurality of nodes;

upon determining, based on the one or more responses, that none of the plurality of nodes are in the active state or in a secondary startup state, entering, by the first node, a look-behind state;

determining, during the look-behind state, whether any additional pings have been received during the initial startup state from other nodes of the plurality of nodes;

upon determining, during the look-behind state, that no additional pings have been received, entering, by the first node, the secondary startup state; and entering, by the first node, the active state, wherein the first node enters the active state as an initial node in a new cluster.

2. The method of claim 1, the method further comprising:
receiving, by the first node, a second startup instruction;
entering, by the first node, the initial startup state;
transmitting, by the first node, a second ping to the plurality of nodes;
determining, based on the second ping, that none of the plurality of nodes are in the active state or the secondary startup state; and
upon determining that at least one additional ping has been received, refraining from entering the secondary startup state.

3. The method of claim 1, the method further comprising:
receiving, by the first node, a second startup instruction;
entering, by the first node, the initial startup state;
transmitting, by the first node, a second ping to the plurality of nodes;
determining, based on the second ping, that at least one node of the plurality of nodes is in the secondary startup state; and
based on determining that the at least one node is in the secondary startup state, transmitting, by the first node, a third ping to the plurality of nodes.

4. The method of claim 1, the method further comprising:
receiving, by the first node, a second startup instruction;
entering, by the first node, the initial startup state;
transmitting, by the first node, a second ping to the plurality of nodes;
determining, based on the second ping, that at least one node of the plurality of nodes is in the initial startup state; and
upon determining that the at least one node has a higher priority than the first node, transmitting, by the first node, a third ping to the plurality of nodes.

5. The method of claim 1, the method further comprising:
receiving, by the first node, a second startup instruction;
entering, by the first node, the initial startup state;
transmitting, by the first node, a second ping to the plurality of nodes;
determining, based on the second ping, that at least one node of the plurality of nodes is in the secondary startup state; and
upon determining that the first node has a higher priority than the at least one node:
  upon determining that no additional pings have been received, entering, by the first node, the secondary startup state; and
  entering, by the first node, the active state, wherein the first node enters the active state as an initial node in a new cluster.

6. The method of claim 1, the method further comprising:
receiving, by the first node, a second startup instruction;
entering, by the first node, the initial startup state;
transmitting, by the first node, a second ping to the plurality of nodes; and upon determining, based on the second ping, that at least one node of the plurality of nodes is in the active state:
  identifying a first cluster to which the at least one node belongs;
  entering, by the first node, the secondary startup state; and
  entering, by the first node, the active state, wherein the first node joins the first cluster.

7. The method of claim 1, wherein determining, based on the first ping, that none of the plurality of nodes are in an active state or in a secondary startup state comprises:
receiving, by the first node, a plurality of responses from the plurality of nodes; and
classifying each respective node of the plurality of nodes based on the plurality of responses, wherein classifying each respective node comprises labeling each respective node as (i) in the initial startup state, (ii) in the secondary startup state, (iii) in the active state, or (iv) unresponsive.

8. A computer-readable storage medium having computer-readable program code embodied therewith, the computer-readable program code executable by one or more computer processors to perform an operation comprising:
receiving, by a first node of a plurality of nodes, a first startup instruction commanding the first node to enter an active state;
responsive to receiving the first startup instruction, beginning startup by entering, by the first node, an initial startup state;
transmitting, by the first node in the initial startup state, a first ping to the plurality of nodes;
receiving, by the first node in the initial startup state, one or more responses to the first ping, wherein the one or more responses indicate a current state of one or more nodes of the plurality of nodes;
upon determining, based on the one or more responses, that none of the plurality of nodes are in the active state or in a secondary startup state, entering, by the first node, a look-behind state;
determining, during the look-behind state, whether any additional pings have been received during the initial startup state from other nodes of the plurality of nodes;
upon determining, during the look-behind state, that no additional pings have been received, entering, by the first node, the secondary startup state; and
entering, by the first node, the active state, wherein the first node enters the active state as an initial node in a new cluster.

9. The computer-readable storage medium of claim 8, the operation further comprising:
receiving, by the first node, a second startup instruction;
entering, by the first node, the initial startup state;
transmitting, by the first node, a second ping to the plurality of nodes;
determining, based on the second ping, that none of the plurality of nodes are in the active state or the secondary startup state; and
upon determining that at least one additional ping has been received, refraining from entering the secondary startup state.

10. The computer-readable storage medium of claim 8, the operation further comprising:
receiving, by the first node, a second startup instruction;
entering, by the first node, the initial startup state;
transmitting, by the first node, a second ping to the plurality of nodes;

determining, based on the second ping, that at least one node of the plurality of nodes is in the secondary startup state; and based on determining that the at least one node is in the secondary startup state, transmitting, by the first node, a third ping to the plurality of nodes.

11. The computer-readable storage medium of claim 8, the operation further comprising:

receiving, by the first node, a second startup instruction;
entering, by the first node, the initial startup state;
transmitting, by the first node, a second ping to the plurality of nodes;
determining, based on the second ping, that at least one node of the plurality of nodes is in the initial startup state; and
upon determining that the at least one node has a higher priority than the first node, transmitting, by the first node, a third ping to the plurality of nodes.

12. The computer-readable storage medium of claim 8, the operation further comprising:

receiving, by the first node, a second startup instruction;
entering, by the first node, the initial startup state;
transmitting, by the first node, a second ping to the plurality of nodes;
determining, based on the second ping, that at least one node of the plurality of nodes is in the secondary startup state; and
upon determining that the first node has a higher priority than the at least one node:
  upon determining that no additional pings have been received, entering, by the first node, the secondary startup state; and
  entering, by the first node, the active state, wherein the first node enters the active state as an initial node in a new cluster.

13. The computer-readable storage medium of claim 8, the operation further comprising:

receiving, by the first node, a second startup instruction;
entering, by the first node, the initial startup state;
transmitting, by the first node, a second ping to the plurality of nodes; and
upon determining, based on the second ping, that at least one node of the plurality of nodes is in the active state:
  identifying a first cluster to which the at least one node belongs;
  entering, by the first node, the secondary startup state; and
  entering, by the first node, the active state, wherein the first node joins the first cluster.

14. The computer-readable storage medium of claim 8, wherein determining, based on the first ping, that none of the plurality of nodes are in an active state or in a secondary startup state comprises:

receiving, by the first node, a plurality of responses from the plurality if nodes; and
classifying each respective node of the plurality of nodes based on the plurality of responses, wherein classifying each respective node comprises labeling each respective node as (i) in the initial startup state, (ii) in the secondary startup state, (iii) in the active state, or (iv) unresponsive.

15. A system comprising:

one or more computer processors; and
a memory containing a program which when executed by the one or more computer processors performs an operation, the operation comprising:

receiving, by a first node of a plurality of nodes, a first startup instruction commanding the first node to enter an active state;
responsive to receiving the first startup instruction, beginning startup by entering, by the first node, an initial startup state;
transmitting, by the first node in the initial startup state, a first ping to the plurality of nodes;
receiving, by the first node in the initial startup state, one or more responses to the first ping, wherein the one or more responses indicate a current state of one or more nodes of the plurality of nodes;
upon determining, based on the one or more responses, that none of the plurality of nodes are in the active state or in a secondary startup state, entering, by the first node, a look-behind state;
determining, during the look-behind state, whether any additional pings have been received during the initial startup state from other nodes of the plurality of nodes;
upon determining, during the look-behind state, that no additional pings have been received, entering, by the first node, the secondary startup state; and
entering, by the first node, the active state, wherein the first node enters the active state as an initial node in a new cluster.

16. The system of claim 15, the operation further comprising:

receiving, by the first node, a second startup instruction;
entering, by the first node, the initial startup state;
transmitting, by the first node, a second ping to the plurality of nodes;
determining, based on the second ping, that none of the plurality of nodes are in the active state or the secondary startup state; and
upon determining that at least one additional ping has been received, refraining from entering the secondary startup state.

17. The system of claim 15, the operation further comprising:

receiving, by the first node, a second startup instruction;
entering, by the first node, the initial startup state;
transmitting, by the first node, a second ping to the plurality of nodes;
determining, based on the second ping, that at least one node of the plurality of nodes is in the secondary startup state; and
based on determining that the at least one node is in the secondary startup state, transmitting, by the first node, a third ping to the plurality of nodes.

18. The system of claim 15, the operation further comprising:

receiving, by the first node, a second startup instruction;
entering, by the first node, the initial startup state;
transmitting, by the first node, a second ping to the plurality of nodes;
determining, based on the second ping, that at least one node of the plurality of nodes is in the initial startup state; and
upon determining that the at least one node has a higher priority than the first node, transmitting, by the first node, a third ping to the plurality of nodes.

19. The system of claim 15, the operation further comprising:

receiving, by the first node, a second startup instruction;
entering, by the first node, the initial startup state;

transmitting, by the first node, a second ping to the plurality of nodes;

determining, based on the second ping, that at least one node of the plurality of nodes is in the secondary startup state; and upon determining that the first node has a higher priority than the at least one node:

upon determining that no additional pings have been received, entering, by the first node, the secondary startup state; and entering, by the first node, the active state, wherein the first node enters the active state as an initial node in a new cluster.

20. The system of claim 15, the operation further comprising:

receiving, by the first node, a second startup instruction;

entering, by the first node, the initial startup state;

transmitting, by the first node, a second ping to the plurality of nodes; and upon determining, based on the second ping, that at least one node of the plurality of nodes is in the active state:

identifying a first cluster to which the at least one node belongs;

entering, by the first node, the secondary startup state; and entering, by the first node, the active state, wherein the first node joins the first cluster.

\* \* \* \* \*